(12) United States Patent
Tanaka et al.

(10) Patent No.: US 11,198,410 B2
(45) Date of Patent: Dec. 14, 2021

(54) SIDE AIRBAG DEVICE

(71) Applicant: TOYODA GOSEI CO., LTD., Kiyosu (JP)

(72) Inventors: Koki Tanaka, Kiyosu (JP); Takashi Iida, Kiyosu (JP); Kenichi Fukurono, Kiyosu (JP); Yuji Sato, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 85 days.

(21) Appl. No.: 16/600,821

(22) Filed: Oct. 14, 2019

(65) Prior Publication Data

US 2020/0122679 A1  Apr. 23, 2020

(30) Foreign Application Priority Data

Oct. 22, 2018  (JP) .............................. JP2018-198285

(51) Int. Cl.
*B60R 21/231* (2011.01)
*B60R 21/21* (2011.01)
*B60R 21/00* (2006.01)

(52) U.S. Cl.
CPC ........ *B60R 21/23138* (2013.01); *B60R 21/21* (2013.01); *B60R 2021/0006* (2013.01); *B60R 2021/23107* (2013.01)

(58) Field of Classification Search
CPC ................ B60R 21/207; B60R 21/233; B60R 21/23138
See application file for complete search history.

(56) References Cited

U.S. PATENT DOCUMENTS

| | | | | |
|---|---|---|---|---|
| 5,630,616 | A * | 5/1997 | McPherson | B60R 21/207 280/728.2 |
| 7,819,423 | B2 * | 10/2010 | Loibl | B60R 21/233 280/730.2 |
| 8,702,123 | B2 * | 4/2014 | Mazanek | B60R 21/231 280/730.2 |
| 10,112,569 | B2 * | 10/2018 | Hiraiwa | B60R 21/233 |
| 10,377,337 | B2 * | 8/2019 | Kunisada | B60R 21/207 |
| 10,391,966 | B2 * | 8/2019 | Kunisada | B60R 21/23138 |
| 10,870,405 | B2 * | 12/2020 | Kwon | B60R 21/207 |
| 10,875,487 | B2 * | 12/2020 | Kobayashi | B60R 21/207 |
| 2004/0232666 | A1 | 11/2004 | Sato et al. | |
| 2014/0035264 | A1 * | 2/2014 | Fukushima | B60R 21/23138 280/730.2 |

(Continued)

FOREIGN PATENT DOCUMENTS

| | | | | |
|---|---|---|---|---|
| DE | 9405143 U1 * | 5/1994 | ........... | B60R 21/233 |
| DE | 19646698 A1 * | 5/1997 | ....... | B60R 21/23138 |

(Continued)

*Primary Examiner* — Nicole T Verley
(74) *Attorney, Agent, or Firm* — Posz Law Group, PLC (57) ABSTRACT

A side airbag device includes a main bag which is an airbag deployed between a passenger seated on a seat and a side wall portion of a vehicle. The airbag expands by gas supply when a vehicle side collision occurs. The side airbag device also includes a sub bag deployed between a side frame on a vehicle outer side in a seat back of the seat and the passenger. The sub bag expands by supplying gas and pushes a waist portion of the passenger forward from backward, prior to deployment of the main bag, when the vehicle side collision occurs.

3 Claims, 4 Drawing Sheets

(56) References Cited

U.S. PATENT DOCUMENTS

| | | | |
|---|---|---|---|
| 2014/0151984 A1* | 6/2014 | Fukawatase | B60R 21/23138 |
| | | | 280/730.2 |
| 2017/0182969 A1* | 6/2017 | Fujiwara | B60R 21/207 |
| 2017/0369020 A1 | 12/2017 | Hiraiwa et al. | |
| 2018/0022308 A1* | 1/2018 | Kunisada | B60R 21/23138 |
| | | | 280/730.2 |
| 2018/0022309 A1* | 1/2018 | Kunisada | B60R 21/26 |
| | | | 280/730.2 |
| 2018/0050651 A1* | 2/2018 | Fukawatase | B60R 21/207 |
| 2018/0222435 A1* | 8/2018 | Fukawatase | B60R 21/2338 |
| 2018/0290619 A1* | 10/2018 | Kitagawa | B60R 21/207 |
| 2019/0054890 A1* | 2/2019 | Kwon | B60R 21/23138 |
| 2019/0061676 A1* | 2/2019 | Kwon | B60R 21/233 |
| 2019/0152421 A1* | 5/2019 | Byun | B60R 21/231 |
| 2020/0262383 A1* | 8/2020 | Rahman | B60R 21/233 |

FOREIGN PATENT DOCUMENTS

| | | |
|---|---|---|
| JP | 4075680 B2 | 2/2008 |
| JP | 2009-018715 A | 1/2009 |
| JP | 5321155 B2 | 9/2010 |
| JP | 2017-226381 A | 12/2017 |

\* cited by examiner

SIDE AIRBAG DEVICE

CROSS-REFERENCE TO RELATED APPLICATION(S)

This application is based upon and claims the benefit of priority from prior Japanese patent application No. 2018-198285 filed on Oct. 22, 2018, the entire contents of which are incorporated herein by reference.

BACKGROUND

1. Field of the Invention

The present invention relates to a side airbag device.

2. Description of the Related Art

In related arts, a vehicle such as an automobile is provided with a side airbag device including an airbag which expands by gas supply and is deployed between a passenger seated on a seat and a side wall portion of a vehicle such as a door trim when a side collision occurs (see JP-A-2017-226381, for example).

The side airbag device described in JP-A-2017-226381 includes an inflator disposed in a vehicle-outer-side side portion in a seat back of a seat and an airbag including a main inflating portion and a sub inflating portion.

The main inflating portion is accommodated in the vehicle-outer-side side portion in the seat back. The main inflating portion expands by inflating gas supplied from the inflator, exits from the seat back, and is deployed forward between the passenger seated on the seat and the side wall portion of the vehicle.

At least a main part of the sub inflating portion is accommodated in the vehicle-outer-side side portion in the seat back. Prior to the deployment of the main inflating portion outside the seat back, the sub inflating portion expands in the seat back to press the passenger to the vehicle outer side by the inflating gas from the inflator. The sub inflating portion is provided corresponding a portion from the shoulder portion to the chest of the passenger.

In the side airbag device, in a case of a side collision at a high speed where the airbag cannot be deployed in time, the passenger may come into contact with a door and cause a fracture of the waist. On the contrary, in the side airbag device described in JP-A-2017-226381, the portion from the shoulder portion to the chest of the passenger is pressed to the vehicle inner side by inflating the sub inflating portion in the seat back prior to the deployment of the main inflating portion of the airbag. However, although the shoulder portion and chest of the passenger are pressed to the vehicle inner side, it is difficult to move the entire body of the passenger, so there is still room for improving the protection performance of the passenger.

SUMMARY

An object of this invention is to provide a side airbag device which can improve protection performance of a passenger at the time of a side collision of a vehicle.

According to a first aspect of the invention, there is provided a side airbag device including: a main bag which is an airbag deployed between a passenger seated on a seat and a side wall portion of a vehicle, the airbag being configured to expand by gas supply when a vehicle side collision occurs; and a sub bag deployed between a side frame on a vehicle outer side in a seat back of the seat and the passenger, the sub bag being configured to expand by supplying gas and push a waist portion of the passenger forward from backward, prior to deployment of the main bag, when the vehicle side collision occurs.

According to the configuration, first, the sub bag is deployed between the side frame on the vehicle outer side and the passenger when the vehicle side collision occurs. A vehicle-outer-side portion of the waist portion of the passenger is pushed from the rear toward the front by the sub bag. Therefore, the seating posture of the passenger can be easily changed to the vehicle inner side by rotating the passenger around the waist portion. As a result, it is possible to cause the passenger to take a posture difficult to receive an impact from the side wall portion such as a door entering inside. Therefore, the protection performance of the passenger at the time of the vehicle side collision can be improved.

According to a second aspect of the invention, in the first aspect, a support member connected to a seat frame of the seat may be provided in a vehicle inner side of the side frame, the sub bag may be attached to the side frame and be deployed between the support member and the side frame, and at least one of the sub bag and the side frame and the support member may be connected to a connecting member having flexibility which is located in front of the sub bag to be deployed in a front-rear direction of the vehicle.

Since the seat back is lighter than the passenger, if the sub bag is deployed, there is a concern that the sub bag may push back the seat back and move backward, losing the mass of the passenger. Therefore, there is a concern that the waist portion of the passenger cannot be effectively pushed from the rear to the front by the sub bag.

Therefore, according to the configuration described above, when the sub bag is deployed between the support member and the side frame, the flexible connecting member located on the front side of the sub bag is pulled by the pressure. Since the connecting member is connected to at least one of the sub bag and the side frame and the support member, external force which pulls the support member toward the front side acts. Therefore, the seat frame is pulled toward the front side through the support member, and thus the rearward movement of the seat back is prevented. Therefore, the waist portion of the passenger can be effectively pushed from the rear to the front by the sub bag.

According to a third aspect of the invention, in the second aspect, when the connecting member is set as a front connecting member, a rear connecting member having flexibility which connects at least one of the sub bag and the side frame to the support member and is located behind the sub bag to be deployed in the front-rear direction of the vehicle may be provided.

According to the configuration, the rearward movement of the deployed sub bag is prevented by the rear connecting member. Therefore, the sub bag can be deployed toward the front side. Therefore, the front connecting member can be effectively pulled by the pressure of the sub bag.

Since the rear connecting member has flexibility, the rear connecting member can be folded together with the sub bag and the front side connecting member and provided inside the seat back.

According to a fourth aspect of the invention, in any one of the first to third aspects, the main bag and the sub bag may be communicated through a communication hole, and a gas generator may be provided inside the sub bag.

According to the configuration, the gas generated from the gas generator makes the sub bag deployed and flows into the main bag through the communication hole to deploy the main bag. As a result, it is possible to realize the deployment of the sub bag before the deployment of the main bag with one gas generator. Therefore, the configuration of the side airbag device can be simplified.

According to a fifth aspect of the invention, in any one of the first to third aspects, the main bag and the sub bag may be independent of each other, and a gas generator may be provided inside each of the main bag and the sub bag.

According to the configuration, the development time of the main bag and the sub bag can be controlled independently of each other.

According to a sixth aspect of the invention, there is provided a side airbag device including: a main bag which is an airbag deployed between a passenger seated on a seat and a side wall portion of a vehicle, the airbag being configured to expand by gas supply when a vehicle side collision occurs; and a sub bag, wherein: a support member connected to a seat frame of the seat is provided on a vehicle inner side of a side frame on a vehicle outer side in a seat back of the seat; the sub bag which is attached to the side frame and is deployed between the support member and the side frame prior to deployment of the main bag due to gas supply when a vehicle side collision occurs is provided; and at least one of the sub bag and the side frame and the support member are connected to a connecting member having flexibility which is located in front of the sub bag to be deployed in a front-rear direction of the vehicle.

According to the configuration, when the sub bag is deployed between the support member and the side frame, the flexible connecting member located on the front side of the sub bag is pulled by the pressure. Since the connecting member is connected to at least one of the sub bag and the side frame and the support member, external force acts to pull the support member toward the front side. Therefore, the seat frame is pulled toward the front side through the support member, and thus the rearward movement of the seat back is prevented. Therefore, the passenger can be pushed from the rear to the front by the sub bag. Thereby, the seating posture of the passenger can be easily changed to the vehicle inner side by rotating the passenger. Therefore, it is possible to make the passenger take a posture difficult to receive an impact from the side wall portion such as a door entering inside. As a result, the protection performance of the passenger at the time of the vehicle side collision can be improved.

The passenger protection performance at the time of a vehicle side collision can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of a vehicle side airbag device will be described with reference to FIGS. 1 to 7C.

In the following description, a front-rear direction of the vehicle is simply referred to as a front-rear direction. A description will be given based on the center in a vehicle width direction of a vehicle, the side approaching the center as "vehicle inner side", and the side away from the center as "vehicle outer side". It is assumed that a passenger having the same physique as the collision test dummy is seated on a vehicle seat.

Figure 1:
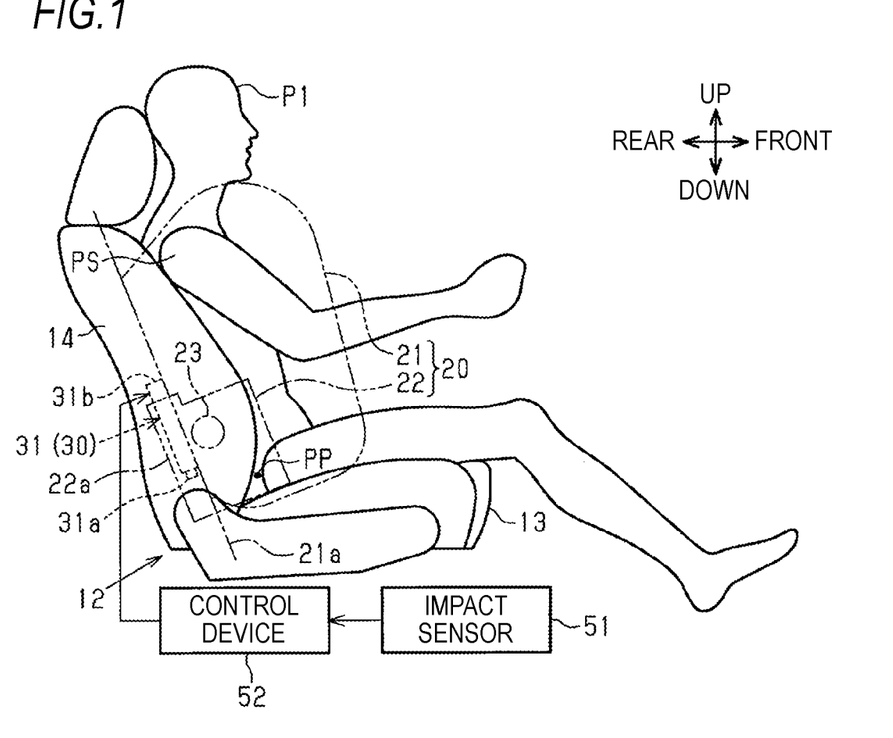
FIG. 1 is a side view illustrating a vehicle seat provided with a side airbag device according to an embodiment together with a passenger.
Figure 2:
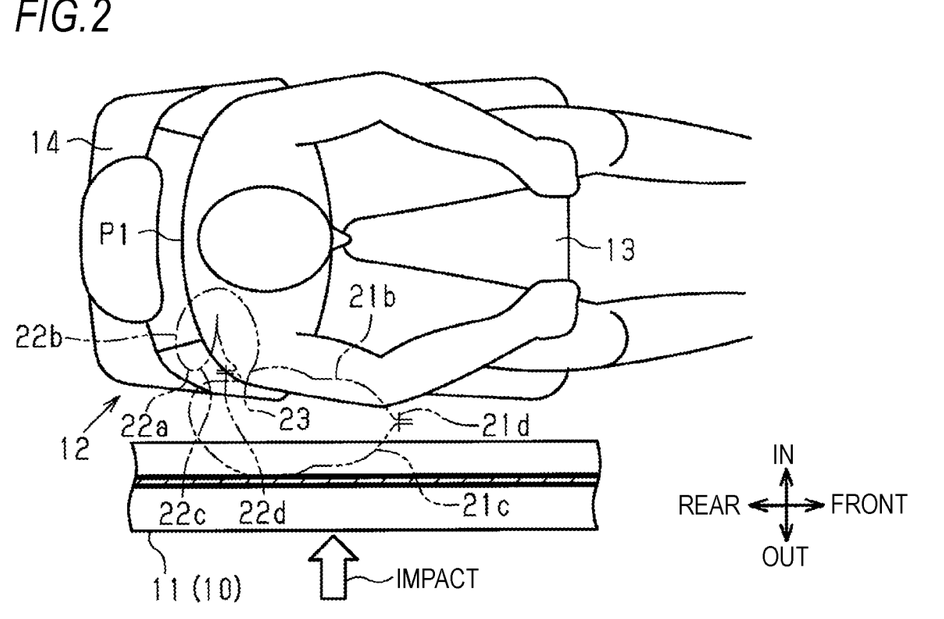
FIG. 2 is a plan cross-sectional view illustrating a positional relationship among a seat, an airbag, a passenger, and a side wall portion in the same embodiment.
Figure 3:
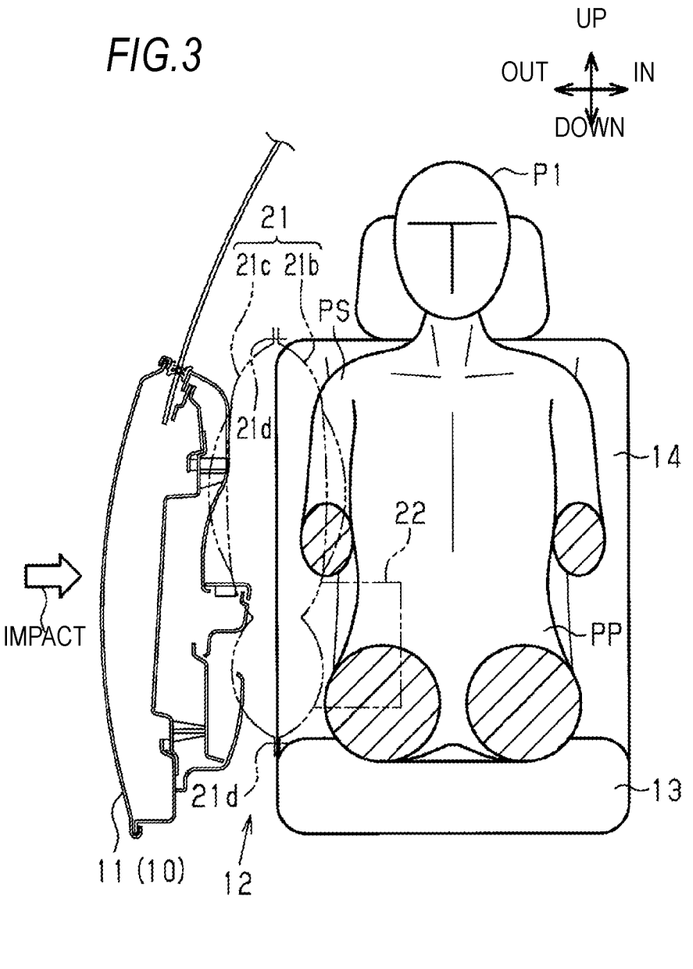
FIG. 3 is a view illustrating the positional relationship among the seat, the airbag, the passenger, and the side wall portion in the same embodiment and is a cross-sectional view as seen from the front to the rear of a vehicle.

As illustrated in FIGS. 1 to 3, in a vehicle 10, a vehicle seat 12 is disposed in a vicinity of the vehicle inner side of a side wall portion 11. Here, the side wall portion 11 refers to a vehicle constituent member disposed on a side portion of the vehicle 10 and mainly corresponds to a door, a pillar, and the like. For example, the side wall 11 corresponding to a front seat is a front door, a center pillar (B pillar), and the like. The side wall portion 11 corresponding to a rear seat is a rear portion of a side door (rear door), a C pillar, a front portion of a tire house, a rear quarter, and the like.

A seat 12 includes a seat cushion 13 and a seat back 14. The seat cushion 13 is attached to a rail (not illustrated) installed on a floor of a vehicle body so that the position in the front-rear direction can be adjusted. The seat back 14 stands up in an inclined state where the seat back 14 is located further on a rear side, as it extends from a rear portion of the seat cushion 13 to the upper side, and is configured to be able to adjust the inclination angle. The seat 12 is disposed in a passenger compartment with the seat back 14 facing forward. A width direction of the seat 12 arranged in this way matches a vehicle width direction.

Next, the internal structure of a side portion on the vehicle outer side in the seat back 14 will be described.

Figure 4:
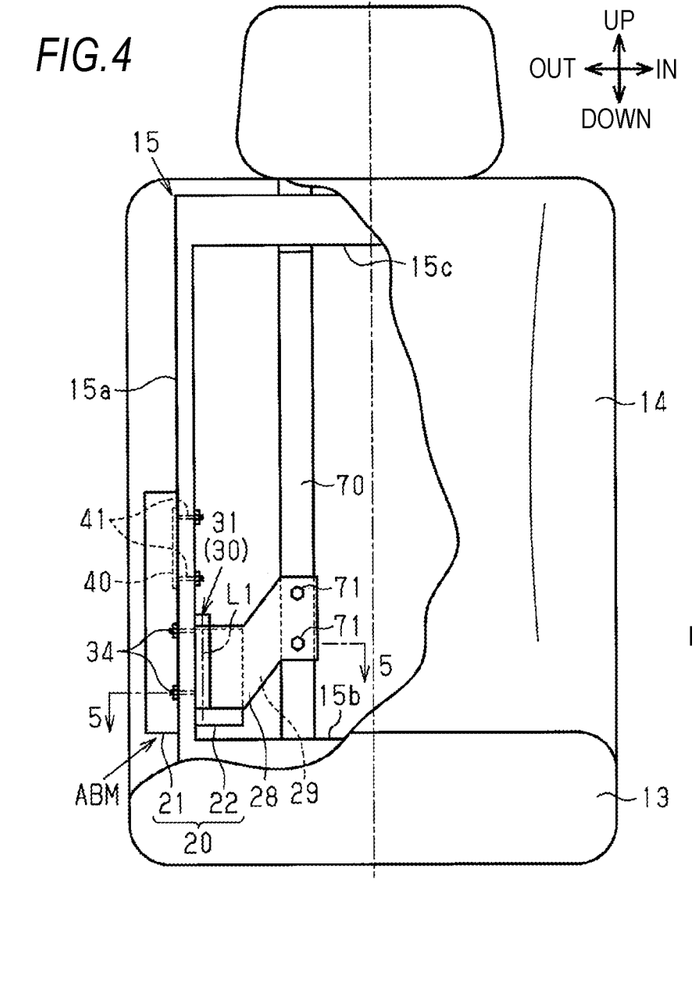
FIG. 4 is a view illustrating the seat in a state where a part of the seat is cut in the same embodiment and is a front view as seen from the front to the rear of the vehicle.

As illustrated in FIG. 4, a seat frame 15 forming a skeleton is disposed inside the seat back 14.

The seat frame 15 includes a pair of side frames 15a extending in a vertical direction and spaced from each other in the vehicle width direction, a lower connecting frame 15b which connects lower end portions of the side frames 15a, and an upper connecting frame 15c which connects upper end portions of the side frames 15a. The seat frame 15 is formed by, for example, bending a metal plate. In FIG. 4, only the side frame 15a on the vehicle outer side is illustrated.

Figure 5:
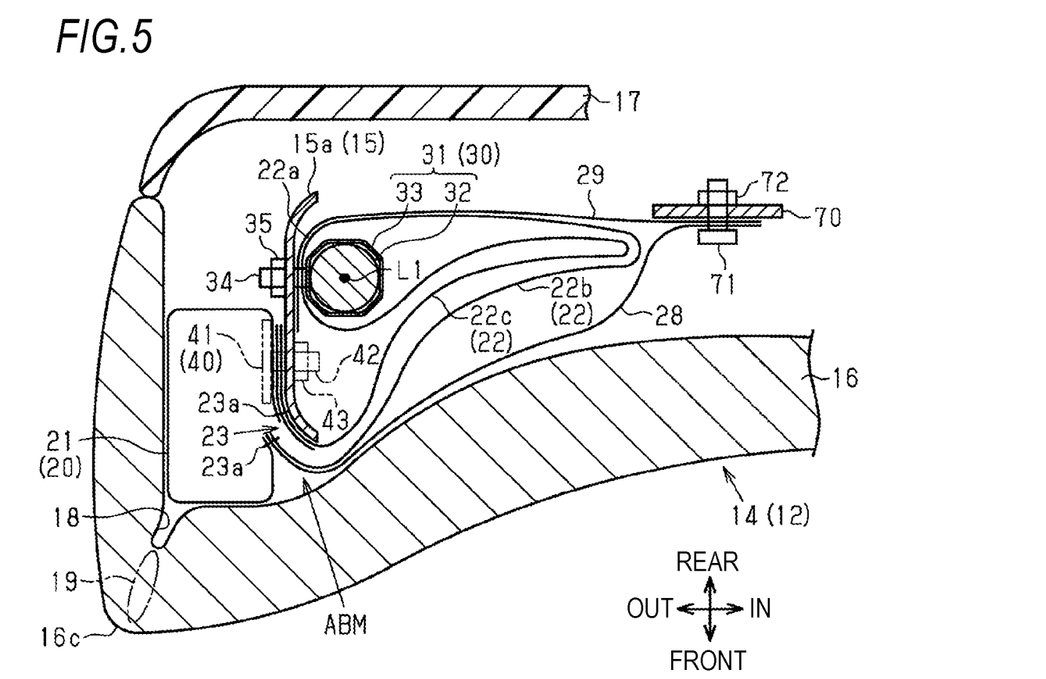
FIG. 5 is a cross-sectional view taken along the line 5-5 of FIG. 4.

As illustrated in FIG. 5, a seat pad 16 made of elastic material such as urethane foam is disposed on the front side of the seat frame 15. A backboard 17 formed of synthetic resin or the like is disposed on the rear side of the seat frame 15. The seat pad 16 is covered with a skin, but the skin is not illustrated in FIG. 5.

Between the side frame 15a on the vehicle outer side and the center position in the width direction of the seat 12, a long support member 70 extending in the vertical direction is provided. The lower end portion and the upper end portion of the support member 70 are respectively connected to the lower connecting frame 15b and the upper connecting frame 15c. The support member 70 is formed of a metal plate.

An airbag module ABM is provided at the corner of the seat pad 16. A corner 18c of the seat pad 16 is provided with a slit 18 which extends obliquely forward and toward the vehicle outer side. A portion (a portion surrounded by an ellipse of a two-dot chain line in FIG. 5) interposed between the corner 16c on the front side of the seat pad 16 and the slit 18 constitutes a planned breaking portion 19 to be broken by the airbag 20 described below.

The airbag module ABM includes an airbag 20 and a gas generator 30 as main constituent member. Next, each of those constituent members will be described.

The gas generator 30 includes a gas generator main body 31 which is a main part of the gas generator 30 and a plurality (two in the present embodiment) of bolts 34 for attaching the gas generator main body 31 to the side frame 15a.

As illustrated in FIG. 5, the gas generator main body 31 includes an inflator 32 and a retainer 33 which covers the inflator 32 and has a long shape extending entirely along an axis L1 (see FIG. 4). The axis L1 extends along an extending direction of the side frame 15a.

Here, as the inflator 32, a type called a pyro-type is employed. The inflator 32 has a substantially cylindrical shape and accommodates a gas generating agent (not illustrated) which generates an expansion gas.

As illustrated in FIG. 1, the gas generator main body 31 includes a gas ejection portion 31a at the lower end portion. A plurality of gas ejection holes (not illustrated) for ejecting the expansion gas are provided on the outer peripheral portion of the gas ejection portion 31a. A harness (not illustrated) serving as an input wiring for an operation signal to the inflator 32 is connected to an upper end portion of the gas generator main body 31, which is the end portion opposite to the gas ejection portion 31a via a connector 31b.

As the inflator 32, instead of the pyro-type using the gas generating agent, a type (hybrid type) in which a partition wall of a high pressure gas cylinder filled with a high pressure gas is broken with an explosive or the like to eject an expansion gas may be used.

As illustrated in FIG. 5, the retainer 33 constitutes the outer peripheral portion of the gas generator main body 31. The retainer 33 is a member which functions as a diffuser for controlling a direction in which the inflation gas is ejected and has a function of fastening the inflator 32 to the side frame 15a together with a sub bag 22 and the like to be described later. Most of the retainer 33 is formed in a substantially cylindrical shape by, for example, bending a plate material such as a metal plate. The retainer 33 is locked to the upper end portion of the inflator 32 by being caulked so that the upper end portion thereof is reduced in diameter.

The two bolts 34 protrude toward the vehicle outer side from locations separated from each other above and below the retainer 33. The protruding direction of each bolt 34 is orthogonal to the axis L1 of the gas generator main body 31.

The gas generator main body 31 may be one in which the inflator 32 and the retainer 33 are integrated. The gas generator main body 31 may be configured only by the inflator 32. Here, the bolt 34 is directly fixed to the inflator 32.

As illustrated in FIGS. 1 to 5, the airbag 20 of the embodiment includes a main bag 21, the sub bag 22, a front connection tether 28, and a rear connection tether 29.

As illustrated in FIGS. 2 and 3, the main bag 21 is inflated by the gas supply from the gas generator 30 when the vehicle collides and deployed between a passenger P1 seated on the seat 12 and the side wall portion 11 of the vehicle.

The main bag 21 is formed by folding a piece of cloth (also called base fabric, panel fabric, or the like) in two at a fold line 21a (see FIG. 1) set at the center in the width direction, overlapping them in the vehicle width direction, and joining the overlapped portions. Here, in order to distinguish two overlapped portions of the main bag 21, the cloth piece located on the vehicle inner side is referred to as a cloth part 21b and the cloth piece located on the vehicle outer side is referred to as a cloth part 21c.

In the present embodiment, the cloth piece is folded in two so that the fold line 21a is located at the rear end portion of the main bag 21. However, the cloth piece may be folded in two so that the fold line 21a is positioned at the other end portion of the main bag 21, for example, the front end portion, the upper end portion, the lower end portion, and the like. The main bag 21 may be constituted of two cloth pieces divided along the fold line 21a. The main bag 21 may be constituted of three or more cloth pieces.

The main bag 21 is formed in a shape and size where many areas of the upper body of the passenger P1, for example, the area corresponding to the part from a waist portion PP to a shoulder portion PS can be covered when the main bag 21 is deployed between the seat 12 and the side wall portion 11.

As the cloth piece, a woven cloth formed using a material which has high strength and flexibility and can be easily folded, for example, a polyester yarn, a polyamide yarn, or the like is suitable.

The above-described joining of the cloth pieces folded in half is performed at a peripheral edge joining portion 21d provided at the peripheral edge portion thereof. In the embodiment, the peripheral edge joining portion 21d is formed by sewing (sewing with a sewing thread) a portion other than the rear end portion of the peripheral edge portion of the cloth piece folded in half. The peripheral joint portion 21d may be formed by means different from the sewing using the above-described sewing thread, for example, bonding using an adhesive.

A communication hole 23 which communicates with the sub bag 22 described below is formed in the lower rear portion of the cloth part 21b on the vehicle inner side (see FIG. 1).

Two bolt holes (not illustrated) are formed at two locations on the cloth part 21b.

As illustrated in FIGS. 4 and 5, the retainer 40 for fixing the main bag 21 to the side frame 15a is accommodated in the main bag 21. The retainer 40 includes a retainer main body 41 having a rectangular plate shape and two bolts 42 protruding from the retainer main body 41.

Each bolt 42 is inserted from the inside of the main bag 21 into each bolt hole (not illustrated) of the cloth part 21b. Each bolt 42 is inserted into the side frame 15a from the vehicle outer side and a nut 43 is tightened to the bolt 42 from the vehicle inner side. In this way, the main bag 21 is fixed to the side frame 15a.

As illustrated in FIG. 5, the main bag 21 is folded in a state where the retainer 40 is accommodated inside the main bag 21, thereby forming a compact shape. This is to make the main bag 21a size suitable for storage with respect to the limited accommodation space in the seat back 14. For example, roll folds and bellows folds are suitable for folding the main bag 21. Roll folding is a folding mode in which one end portion of the main bag 21 is set as a center and the other portion is wound around the end portion. The bellows folding is a folding mode in which the main bag 21 is folded while changing the folding direction alternately by a certain width.

Although it is not illustrated, binding tapes which hold the main bag 21 in a folded state are wound around the upper and lower portions of the main bag 21.

As illustrated in FIGS. 1 to 3, the sub bag 22 is inflated by the supply of gas from the gas generator 30 when the vehicle collides. The sub bag 22 is deployed between the side frame 15a on the vehicle outer side and the support member 70 in the seat back 14 of the seat 12 before the deployment of the main bag 21 and pushes the waist portion PP of the passenger P1 from the rear to the front.

The sub bag 22 is formed by folding a piece of cloth in two at a fold line 22a (see FIG. 1) set at the center in the width direction, overlapping them in the vehicle width direction, and joining the overlapped portions.

In the embodiment, the cloth piece is folded in two so that the fold line 22a is located at the rear end portion of the sub bag 22. However, the cloth piece may be folded in two so that the fold line 22a is positioned at the other end portion of the sub bag 22, for example, the front end portion, the upper end portion, the lower end portion, and the like. The sub bag 22 may be constituted of two cloth pieces divided along the fold line 22a. The sub bag 22 may be constituted of three or more cloth pieces.

The sub bag 22 is formed in a shape and size where the area corresponding to the part on the vehicle outer side of the waist portion PP of the passenger P1 can be covered when the sub bag 22 is deployed between the side frame 15a on the vehicle outer side and the support member 70. Material similar to the main bag 21 is suitable for the cloth piece.

The above-described joining of the cloth pieces folded in half is performed at a peripheral edge joining portion 22d provided at the peripheral edge portion thereof. In the embodiment, the peripheral edge joining portion 22d is formed by sewing (sewing with a sewing thread) a portion other than the rear end portion of the peripheral edge portion of the cloth piece folded in half. The peripheral joint portion 22d may be formed by means different from the sewing using the above-described sewing thread, for example, bonding using an adhesive.

As illustrated in FIG. 5, in the embodiment, the cloth piece folded in half is further folded in half at the center in the width direction and overlapped in the vehicle width direction. More specifically, it is overlapped such that, in the cloth piece folded in half, an end portion located opposite to the fold line 22a is positioned on the vehicle outer side, that is, facing the cloth part 21b on the vehicle inner side of the main bag 21. Here, in the two overlapped parts of the sub bag 22, the one located on the outer side is referred to as a cloth part 22b and the other located on the inner side is referred to as a cloth part 22c.

A communication hole 23 is formed in a portion overlapping the communication hole 23 of the main bag 21 in the cloth part 22b on the outer side. At the periphery edge portion of the communication hole 23, there is provided a joining portion 23a for joining the outside cloth part 22b of the sub bag 22 and the vehicle-inner-side cloth part 21b of the main bag 21 by sewing. Thereby, the main bag 21 and the sub bag 22 are connected and the main bag 21 and the sub bag 22 communicate with each other via the communication hole 23.

As illustrated in FIG. 1, an insertion port for the gas generator 30 is opened upward at the rear upper end portion of the sub bag 22. Bolt holes for inserting the bolts 34 of the gas generator 30 are formed at two locations in the vicinity of the fold line 22a in the outer cloth part 22b (not illustrated).

The gas ejection portion 31a of the gas generator main body 31 is positioned at the lower end portion of the inflator 32 and takes an inclined posture such that the gas generator main body 31 is located further on the rear side while extending to the upper side, and further the gas generator main body 31 is inserted into the rear end portion of the sub bag 22 through the insertion port. The upper end portion of the gas generator main body 31 and the harness are exposed to the outside of the sub bag 22.

Each bolt 34 of the retainer 33 is inserted into each bolt hole (not illustrated) of the outer cloth part 22b from the inside. Each bolt 34 is inserted into the side frame 15a from the vehicle inner side and a nut 35 is tightened to the bolt 34 from the vehicle outer side. Therefore, the sub bag 22 is attached to the side frame 15a (see FIG. 5).

As illustrated in FIGS. 4 and 5, the front connection tether 28 and the rear connection tether 29 both of which have a belt shape are respectively provided in front and rear of the sub bag 22.

As illustrated in FIG. 5, one end portion of the front connection tether 28 is connected to the cloth parts 21b and 22b by being sewed in a state of being pinched between the cloth part 21b on the vehicle inner side of the main bag 21 and the cloth part 22b on the outer side of the sub bag 22. An insertion hole (not illustrated) through which the bolt 42 is inserted is provided at one end portion of the front connection tether 28. Therefore, one end portion of the front connection tether 28 is connected to both the sub bag 22 and the side frame 15a.

As illustrated in FIGS. 4 and 5, the other end portion of the front connection tether 28 is connected to the support member 70 by a pair of bolts 71 and nuts 72 which are spaced apart from each other in the vertical direction.

As illustrated in FIG. 5, at one end portion of the rear connection tether 29, an insertion hole (not illustrated) into which the bolt 34 is inserted is provided. Therefore, one end portion of the rear connection tether 29 is connected to both the sub bag 22 and the side frame 15a.

As illustrated in FIGS. 4 and 5, the other end portion of the rear connection tether 29 is connected to the support member 70 by the pair of bolts 71 and nuts 72.

Those connection tethers 28 and 29 are formed of cloth pieces similar to the main bag 21 and the sub bag 22 and have flexibility.

In FIGS. 1 to 3, the connection tethers 28 and 29 are not illustrated.

As illustrated in FIG. 1, the side airbag device includes an impact sensor 51 and a control device 52 in addition to the airbag module ABM described above. The impact sensor 51 is constituted of an acceleration sensor and the like and detects an impact applied to the vehicle 10 from the outside. The control device 52 controls the operation of the inflator 32 based on a detection signal from the impact sensor 51.

The vehicle 10 is equipped with a seat belt device for restraining the passenger P1 seated on the seat 12, but the seat belt device is not illustrated in FIG. 1.

Next, the operation of the embodiment will be described.

Figure 7A:
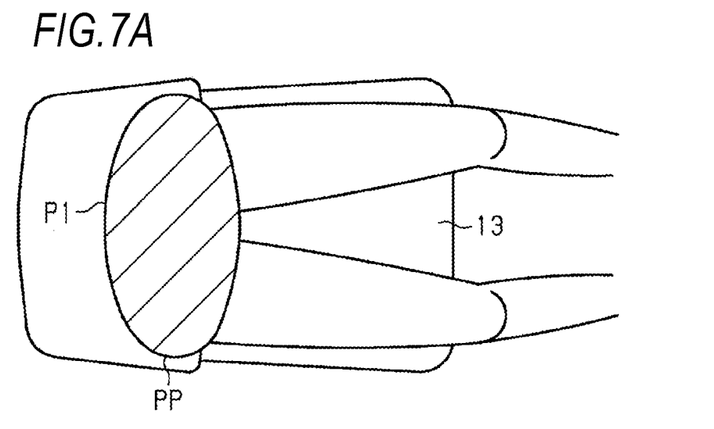
FIGS. 7A to 7C are plan cross-sectional views illustrating the positional relationship among the seat, the airbag, and the passenger in the same embodiment and are views illustrating an operation of the embodiment.

As illustrated in FIG. 7A, in a state where the passenger P1 is seated in the seat 12 with the posture facing forward, when a side collision of the vehicle 10 is detected by the impact sensor 51, the operation of the inflator 32 is controlled by the control device 52, so that gas is ejected from the gas ejection portion 31a into the sub bag 22.

Figure 7B:
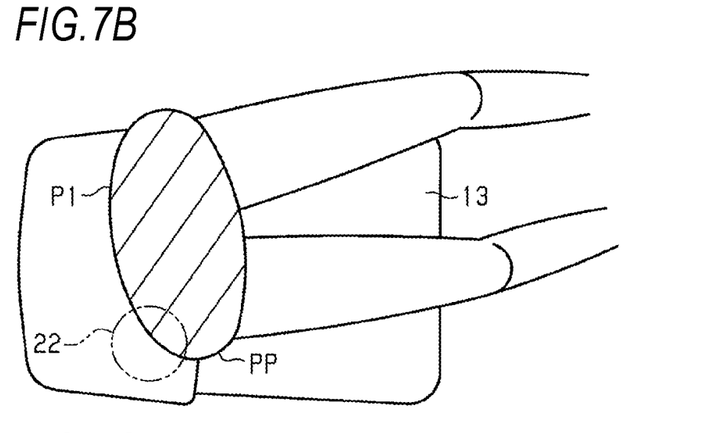

Here, first, as illustrated in FIG. 7B, the sub bag 22 is deployed between the side frame 15a on the vehicle outer side and the passenger P1. Since the sub bag 22 pushes the vehicle-outer-side part of the waist portion PP of the passenger P1 from the rear toward the front, the passenger P1 is rotated around the waist portion PP, so that the seating posture of the passenger P1 is changed to the vehicle inner side.

Figure 7C:
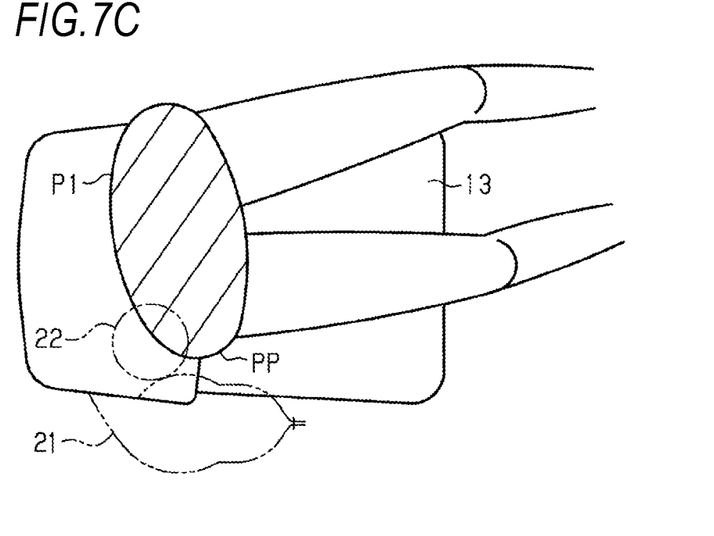

Subsequently, as illustrated in FIG. 7C, when the gas generated from the gas generator 30 flows into the main bag 21 through the communication hole 23, the main bag 21 is deployed between the passenger P1 seated on the seat 12 and the side wall portion 11 of the vehicle.

However, since the seat back 14 is lighter than the passenger P1, if the sub bag 22 is deployed, there is a concern that the sub bag 22 may push back the seat back 14 and move backward, losing the mass of the passenger P1. Therefore, the waist portion PP of the passenger P1 cannot be effectively pushed from the rear to the front by the sub bag 22.

Figure 6:
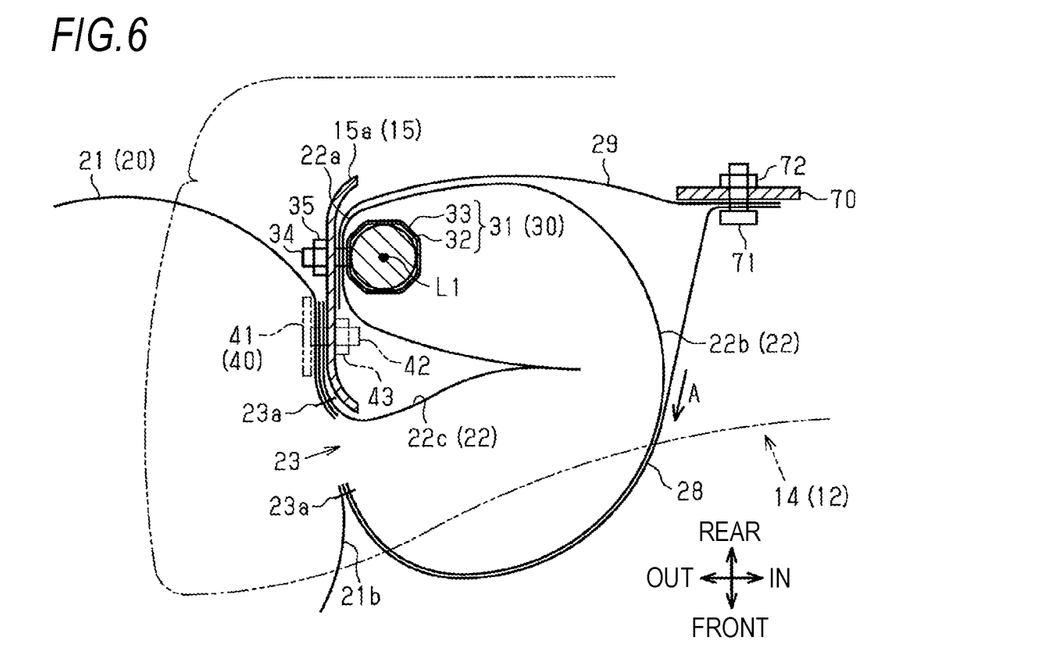
FIG. 6 is a cross-sectional view corresponding to FIG. 5 and is a view illustrating a main bag and a sub bag in a deployed state.

In this regard, according to the embodiment, as illustrated in FIG. 6, when the sub bag 22 is deployed between the support member 70 and the side frame 15a, the rearward movement of the deployed sub bag 22 is prevented by the rear connection tether 29. Therefore, the sub bag 22 is deployed toward the front side. The flexible front connection tether 28 located on the front side of the sub bag 22 is pulled in a direction of the arrow A by the pressure of the sub bag 22. Since the front connection tether 28 is connected to both the sub bag 22 and the side frame 15a and the support member 70, external force which pulls the support member 70 toward the front side acts on the support member 70. Therefore, the seat frame 15 is pulled toward the front side via the support member 70, and thus the rearward movement of the seat bag 14 is prevented.

Next, the effect of embodiment will be described.

(1) The side airbag device includes the main bag 21 which is the airbag 20 expanding by the supply of gas and is deployed between the passenger P1 seated on the seat 12 and the side wall portion 11 of the vehicle when the vehicle collides. The side airbag device includes the sub bag 22 which is inflated by the supply of gas at the time of vehicle side collision, is deployed between the side frame 15a on the vehicle outer side of the seat back 14 of the seat 12 and the passenger P1 before the deployment of the main bag 21, and pushes the waist portion PP of the passenger P1 from the rear to the front.

According to the configuration, since the operation described above is exerted, between the side frame 15a on the vehicle outer side and the passenger P1, the vehicle outer portion of the waist portion PP of the passenger P1 is pushed from the rear toward the front by the deployed sub bag 22. Therefore, the seating posture of the passenger P1 can be easily changed to the vehicle inner side by rotating the passenger P1 around the waist portion PP. As a result, it is possible to cause the passenger P1 to take a posture difficult to receive an impact from the side wall portion 11 such as a door entering inside. Therefore, the protection performance of the passenger P1 at the time of a side collision of the vehicle 10 can be improved.

(2) The support member 70 connected to the seat frame 15 of the seat 12 is provided in the vehicle-inner-side of the side frame 15a. The sub bag 22 is attached to the side frame 15a and is deployed between the support member 70 and the side frame 15a. At least one of the sub bag 22 and the side frame 15a and the support member 70 are connected to the front connection tether 28 having flexibility which is located in front of the deployed sub bag 22.

According to such a configuration, since the operation described above is exerted, the seat frame 15 is pulled toward the front side via the support member 70, so that the rearward movement of the seat back 14 is prevented. Therefore, the waist portion PP of the passenger P1 can be effectively pushed from the rear toward the front by the sub bag 22.

(3) The rear connection tether 29 having flexibility which connects both the sub bag 22 and the side frame 15a to the support member 70 and is located behind the deployed sub bag 22 is provided.

According to such a configuration, movement of the deployed sub bag 22 to the rear is prevented by the rear connection tether 29, so that the sub bag 22 can be deployed toward the front side. Therefore, the front connection tether 28 can be effectively pulled by the pressure of the sub bag 22.

Since the rear connection tether 29 has flexibility, the rear connection tether 29 can be folded together with the sub bag 22 and the front connection tether 28 and provided inside the seat back 14.

(4) The main bag 21 and the sub bag 22 are communicated through the communication hole 23.

The gas generator 30 is provided inside the sub bag 22.

According to such a configuration, the gas generated from the gas generator 30 makes the sub bag 22 deployed and flows into the main bag 21 through the communication hole 23 to deploy the main bag 21. As a result, it is possible to realize the deployment of the sub bag 22 before the deployment of the main bag 21 with one gas generator 30. Therefore, the configuration of the side airbag device can be simplified.

The embodiment can also be changed as follows, for example. The embodiment described above and the following modification examples can be implemented in combination with each other within a technically consistent range.

The main bag 21 and the sub bag 22 are not limited to those communicated through the communication hole 23 and the main bag 21 and the sub bag 22 may be independent of each other. Here, a gas generator similar to the gas generator 30 may be provided instead of the retainer 40. That is, a gas generator may be provided inside each of the main bag 21 and the sub bag 22. According to such a configuration, the expansion and deployment time of the main bag 21 and the sub bag 22 can be controlled independently of each other.

The position of the support member 70 can be appropriately changed, for example, to the center position of the seat back 14 in the width direction.

The front connection tether 28 and the rear connection tether 29 can be integrally formed with a single piece of cloth.

For example, the rear connection tether 29 can be omitted when there is a portion in the seat back 14 that can apply a reaction force directed forward to the sub bag 22.

The support member 70 is not limited to the one connected to the upper and lower connecting frames 15b and 15c and may be extended from the side frame 15a, for example.

The front connection tether 28 may be omitted when the seat back 14 is not likely to move backward with the deployment of the sub bag 22.

What is claimed is:

1. A side airbag device comprising:
a main bag which is an airbag deployed between a passenger seated on a seat and a side wall portion of a vehicle, the airbag being configured to expand by gas supply when a vehicle side collision occurs; and
a sub bag deployed between a side frame on a vehicle outer side in a seat back of the seat and the passenger, the sub bag being configured to expand by supplying gas and push a waist portion of the passenger forward from backward, prior to deployment of the main bag, when the vehicle side collision occurs, wherein
a support member connected to a seat frame of the seat is provided in a vehicle inner side of the side frame;
the sub bag is attached to the side frame and is deployed between the support member and the side frame;
at least one of the sub bag and the side frame and the support member are connected to a connecting member having flexibility which is located in front of the sub bag to be deployed in a front-rear direction of the vehicle; and
when the connecting member is set as a front connecting member, a rear connecting member having flexibility which connects at least one of the sub bag and the side frame to the support member and is located behind the sub bag to be deployed in the front-rear direction of the vehicle is provided.

2. A side airbag device comprising:
a main bag which is an airbag deployed between a passenger seated on a seat and a side wall portion of a vehicle, the airbag being configured to expand by gas supply when a vehicle side collision occurs; and
a sub bag deployed between a side frame on a vehicle outer side in a seat back of the seat and the passenger, the sub bag being configured to expand by supplying gas and push a waist portion of the passenger forward from backward, prior to deployment of the main bag, when the vehicle side collision occurs, wherein:
the main bag and the sub bag are communicated through a communication hole; and
a gas generator is provided inside the sub bag.

3. A side airbag device comprising:
a main bag which is an airbag deployed between a passenger seated on a seat and a side wall portion of a vehicle, the airbag being configured to expand by gas supply when a vehicle side collision occurs; and
a sub bag, wherein:
a support member connected to a seat frame of the seat is provided on a vehicle inner side of a side frame on a vehicle outer side in a seat back of the seat;
the sub bag which is attached to the side frame and is deployed between the support member and the side frame prior to deployment of the main bag due to gas supply when a vehicle side collision occurs is provided; and
at least one of the sub bag and the side frame and the support member are connected to a connecting member having flexibility which is located in front of the sub bag to be deployed in a front-rear direction of the vehicle, wherein
when the connecting member is set as a front connecting member, a rear connecting member having flexibility which connects at least one of the sub bag and the side frame to the support member and is located behind the sub bag to be deployed in the front-rear direction of the vehicle is provided.

* * * * *